United States Patent
Magzimof et al.

(10) Patent No.: US 11,661,089 B2
(45) Date of Patent: May 30, 2023

(54) MAPPING OF INTELLIGENT TRANSPORT SYSTEMS TO REMOTE SUPPORT AGENTS

(71) Applicant: Phantom Auto Inc., Mountain View, CA (US)

(72) Inventors: Shay Magzimof, Palo Alto, CA (US); David Parunakian, Moscow (RU)

(73) Assignee: Phantom Auto Inc., South San Francisco, CA (US)

(*) Notice: Subject to any disclaimer, the term of this patent is extended or adjusted under 35 U.S.C. 154(b) by 370 days.

(21) Appl. No.: 17/011,996

(22) Filed: Sep. 3, 2020

(65) Prior Publication Data

US 2021/0078595 A1 Mar. 18, 2021

Related U.S. Application Data

(60) Provisional application No. 62/900,334, filed on Sep. 13, 2019.

(51) Int. Cl.
*B60W 60/00* (2020.01)
*G05D 1/00* (2006.01)
*G07C 5/00* (2006.01)
*G06N 20/00* (2019.01)
*G07C 5/08* (2006.01)

(52) U.S. Cl.
CPC ......... *B60W 60/005* (2020.02); *G05D 1/0027* (2013.01); *G05D 1/0038* (2013.01); *G06N 20/00* (2019.01); *G07C 5/008* (2013.01); *G07C 5/0808* (2013.01); *G05D 2201/0213* (2013.01)

(58) Field of Classification Search
CPC ... B60W 60/005; G06N 20/00; G05D 1/0027; G05D 1/0038; G07C 5/008; G07C 5/0808
See application file for complete search history.

(56) References Cited

U.S. PATENT DOCUMENTS

| | | | |
|---|---|---|---|
| 8,200,527 B1* | 6/2012 | Thompson | G06Q 30/00 705/7.41 |
| 9,355,562 B1* | 5/2016 | Ferguson | G08G 1/096816 |
| 9,507,346 B1* | 11/2016 | Levinson | G06F 3/1454 |
| 9,606,539 B1* | 3/2017 | Kentley | G05D 1/0088 |
| 10,386,836 B2 | 8/2019 | Lockwood et al. | |
| 10,990,094 B2* | 4/2021 | Ross | G08G 1/0962 |
| 11,016,485 B2* | 5/2021 | Pedersen | G05D 1/0061 |
| 2008/0172574 A1* | 7/2008 | Fisher | G06N 5/02 714/25 |

(Continued)

*Primary Examiner* — Ramsey Refai
(74) *Attorney, Agent, or Firm* — Fenwick & West LLP (57) ABSTRACT

A remote support system facilitates assignment of vehicles to remote support agents for providing teleoperation or other remote support services. The remote support system may generate assignments based on a mapping function that optimizes various parameters based on sensed data associated with the vehicle, a requested service mode of the vehicle, or other factors. In some situations, the remote support server assigns a redundant set of remote support agents to a vehicle that provide similar command streams. The vehicle selects between the command streams to minimize latency or another performance parameter. Alternatively, the remote support server assigns multiple diverse remote support agents to a vehicle that generate diverse command streams. A proxy agent then generates a consensus command stream for providing to the vehicle.

20 Claims, 9 Drawing Sheets (56) References Cited

U.S. PATENT DOCUMENTS

| | | | |
|---|---|---|---|
| 2011/0022653 A1* | 1/2011 | Werth | H04L 67/125 |
| | | | 709/202 |
| 2013/0103973 A1* | 4/2013 | Werth | H04L 41/0816 |
| | | | 714/2 |
| 2015/0248131 A1* | 9/2015 | Fairfield | B60W 30/00 |
| | | | 701/2 |
| 2017/0192423 A1* | 7/2017 | Rust | G05D 1/0238 |
| 2017/0227366 A1* | 8/2017 | Laur | B60W 30/00 |
| 2018/0365908 A1 | 12/2018 | Liu et al. | |
| 2019/0001191 A1 | 1/2019 | Lockwood et al. | |
| 2019/0019349 A1* | 1/2019 | Dolgov | B60W 60/0025 |
| 2019/0187691 A1* | 6/2019 | Magzimof | B60T 7/18 |
| 2019/0196465 A1 | 6/2019 | Hummelshøj | |
| 2019/0258246 A1 | 8/2019 | Liu et al. | |
| 2020/0057436 A1 | 2/2020 | Boda et al. | |

* cited by examiner

MAPPING OF INTELLIGENT TRANSPORT SYSTEMS TO REMOTE SUPPORT AGENTS

RELATED APPLICATIONS

This application claims the benefit of U.S. Provisional Application No. 62/900,334 filed on Sep. 13, 2019, which is incorporated by reference herein.

BACKGROUND

Technical Field

The disclosed embodiments relate generally to connected vehicles, and more specifically, to a system for selecting and assigning remote support agents to interact with one or more vehicles to provide remote support, monitoring, or other services.

Description of the Related Art

Recent advances in autonomous vehicle technologies promise to revolutionize all kinds of ground transportation, including private motor cars, cargo truck fleets, and the taxi industry. Achieving a safety level of such intelligent transport systems (ITS) at least equal to that of experienced human drivers and eventually surpassing it is the foremost concern of ITS developers.

One of the latest trends in ITS technology is development of always-online vehicles that keep a running connection to a remote server in order to transmit telemetry and video feeds. Such feeds can then be used either in offline mode for tasks such as incident analysis or for real-time processing by a human operator, machine intelligence agent, or a combination thereof to remotely operate the vehicle. However, the complexity of managing support services for connected vehicles grows significantly with the number of vehicles and the different types of available remote support services made available.

SUMMARY OF THE EMBODIMENTS

A remote support server manages assignments of remote support agents to vehicles. The remote support server obtains a request for a remote support assignment. The remote support server determines a mapping of the vehicle to one or more remote support agents based on a mapping function and sends the request to the one or more remote support agents. The remote support server receives at least one confirmation response from the one or more remote support agents and assigns at least one confirming remote support agent to the vehicle. The remote support server then establishes a remote support session between the at least one confirming remote support agent and the vehicle. The remote support agent may include an interface to a remote support terminal that receives controls from a human operator, or the remote support agent may comprise a fully autonomous machine intelligence agent.

In an embodiment, the remote support server assigns multiple remote support agents to the vehicle that each generate similar command streams to enable the vehicle to select between the command streams to minimize latency or another performance parameter.

In another embodiment, the remote support server assigns multiple diverse remote support agents to a vehicle that each execute different models for generating control commands in response to sensor data. A proxy server determines a consensus command based on the multiple diverse commands from the remote support agents and sends the consensus command to the vehicle.

In various embodiments, the remote support server can provide support in different operational modes with varying levels of control between the vehicle drive system and the remote support agent.

DETAILED DESCRIPTION

A remote support system facilitates assignment of vehicles to remote support agents for providing teleoperation or other remote support services. During a remote support session, a vehicle system obtains sensor data from a sensor array and communicates the sensor data to the remote support server. The remote support server presents the sensor data to a human operator, a machine intelligence agent, or both to obtain control commands in response to the sensor data. The vehicle system then receives control commands from the remote support server for controlling a drive system of the vehicle.

The remote support system may support fleets of connected vehicles or individual vehicles using machine intelligence agents or human operators. The remote support system facilitates assignments according to priority levels, sensed environmental conditions, external data sources, or other factors. The assignments may be made to support one-to-one, one-to-many, or many-to-one mappings between operators and vehicles.

In various embodiments, the remote support server generates redundant assignments of remote support agents to a vehicle and maintains multiple concurrent remote support sessions. Here, low latency response times can be managed by switching between the redundant command streams to select the stream with lowest latency. In other embodiments, multiple assignments can be made to diverse remote support agents that operate according to different control principles and generate diverse command streams. A proxy agent can then acquire the diverse command streams and produce consensus commands for supporting the vehicle.

Figure 1:
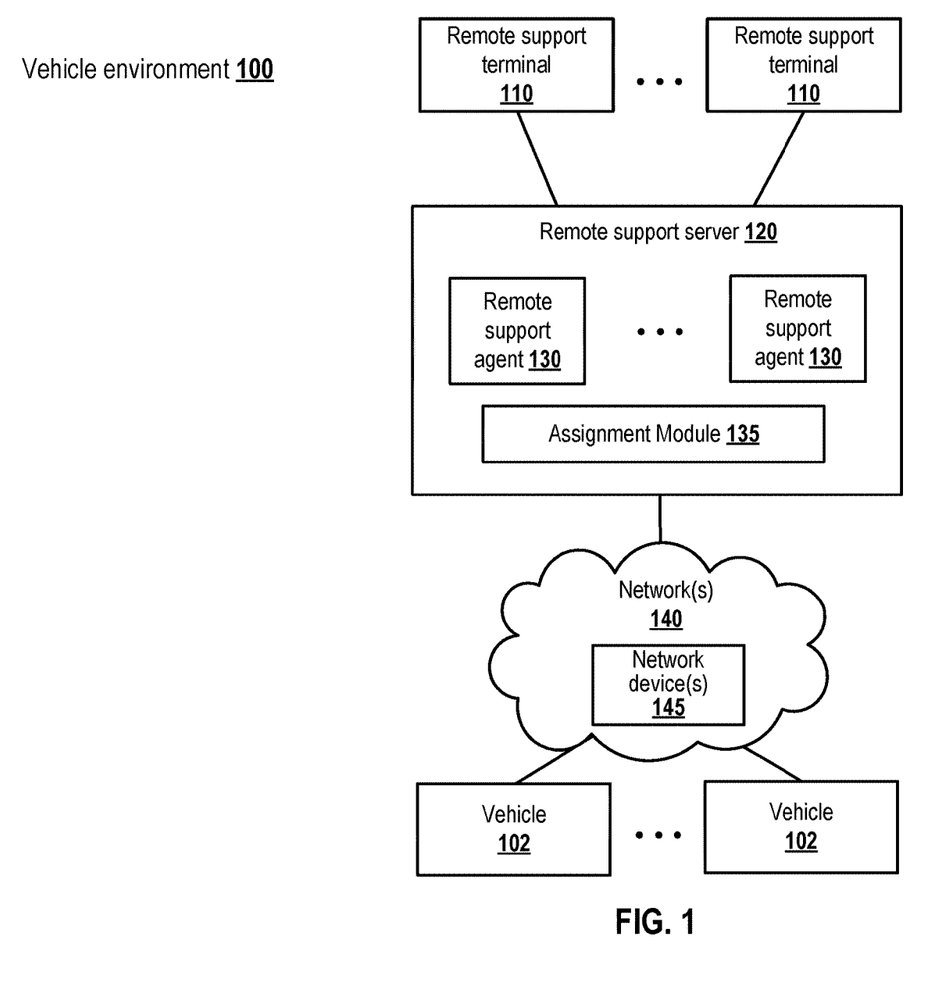
FIG. 1 is a block diagram illustrating an example embodiment of a remote support environment.

FIG. 1 is a block diagram of a vehicle environment 100 including a plurality of vehicles 102, a remote support server 120 coupled to one or more remote support terminals 110, and one or more networks 140 comprising network devices 145. In alternative embodiments, the vehicle environment 100 may include different or additional components.

The vehicle 102 comprises a land vehicle (e.g. a car or truck), a seaborne vehicle, a subterranean vehicle, an airborne vehicle, or other vehicle. The vehicle 102 may comprise an intelligent transport system (ITS) that connects to one or more networks 140 and communicates with one or more entities via the one or more networks 140 (e.g., the remote support server 120 and/or other vehicles 102) to enable the vehicle 102 to obtain information useful to safe navigation of an environment. In an embodiment, the vehicle 102 may comprise an autonomous or semi-autonomous vehicle that includes an autonomous driving system that automatically controls navigation based on sensed environment conditions. Alternatively, the vehicle 102 may comprise a non-autonomous vehicle that relies on control inputs from a driver in the vehicle 102 or from the remote support server 120. In the case of teleoperation, the vehicle 102 wirelessly receives control inputs via the one or more networks 140 that control various components of the drive system such as the steering system, acceleration, braking, etc. The vehicle 102 may also comprise various sensors such as optical or infrared cameras, ranging devices such as LIDAR, sonar or radar units, or other sensor types that enable real-time acquisition of data relating to the vehicle environment 100, components and occupants of the vehicle 102, and captured images or other environmental data. The captured data may be streamed over the one or more networks 140 to the remote support server 120.

The vehicle 102 may depend on a reliable network connection for streaming video or other sensor data to the remote support server 120 and for receiving control inputs or data used by the vehicle 102 to navigate in a safe and efficient manner. For example, to provide teleoperation support to a vehicle 102, it is important that the video stream from the vehicle is received at the remote support server 120 in real-time with low latency. Likewise, it is important that the control stream from the remote support server 120 is transmitted to the vehicle 102 in real-time with low latency. Therefore, the vehicle 102 may switch between different networks 140, may switch between different connections to different network devices 145 of the networks 140, and/or may maintain multiple simultaneous connections to optimize its connectivity.

The remote support server 120 includes one or more remote support agents 130 and an assignment module 135. A remote support agent 130 communicates with a vehicle 102 to provide teleoperation or other support services in instances when extra assistance is desired. For example, the vehicle 102 may request teleoperation assistance from the remote support agent 130 when one or more vehicle sensors fail, when an unknown problem occurs with the vehicle's autonomous driving software, when the vehicle 102 encounters a barrier or other hazardous road conditions, or when a passenger manually requests remote assistance. Furthermore, the remote support agent 130 may provide teleoperation support when the vehicle 102 enters a geographic region where it is not legally permitted to operate in a completely autonomous way. In other cases, vehicles 102 may maintain a continuous connection to a remote support agent 130 regardless of the environmental conditions.

A remote support agent 130 may also provide other types of remote support that is not necessarily teleoperation. For example, a remote support agent 130 may provide navigation guidance, remote monitoring, or other services without necessarily teleoperating the vehicle 102.

In an embodiment, the remote support agent 130 facilitates support via a remote support terminal 110 that has a human operator associated with the remote support agent 130. Here, upon requesting remote support, a video stream capturing the vehicle environment may be provided by the vehicle 102 to the remote support agent 130 and presented at the remote support terminal 110. The human teleoperator at the remote support terminal 110 may view the video stream on a display to assess the situation and take appropriate action via a control input device at the remote support terminal 110. The remote terminal 110 provides real-time control data from the human operator to the remote support agent, which communicates control data to the vehicle 102 to enable the teleoperator to remotely drive the vehicle 102.

The remote support terminal 110, if present, may be coupled to the remote support server 120 via a local area network connection, a direct wired connection, or via a remote connection through the network 140. The remote support terminal 110 may include a display to enable a human teleoperator to view real-time video of the vehicle environment and controls for enabling a human teleoperator to control the vehicle. In an embodiment, the video may include at least a front view that mimics or approximates the view seen by a driver within the vehicle 102. Optionally, the video may include additional views, such as a rear view video, side view videos, or other views that may mimic the views seen by a driver in mirrors of a traditional vehicle or may include other views not necessarily available to a driver of a traditional vehicle. The controls may include controls that mimic those available within a traditional vehicle such as a steering wheel, acceleration pedal, and brake pedal. Alternatively, different forms of controls may be available at the remote terminal 110 such as a joystick, mouse, touch screen, voice control system, gesture control system, or other input mechanism to control one or more aspects of the vehicle 102.

In another embodiment, the remote support agent 130 may comprise an artificial intelligence agent that does not necessarily require a remote support terminal 110 with a display or physical controls for providing human input. Here, the remote support agent 130 may provide control instructions to the vehicle 102 directly based on the processing of a real-time video feed and other sensor data streamed to the remote support agent 130 from the vehicle 102 without necessarily utilizing any human input. In embodiments where the teleoperation support module 130 operates entirely as an artificial intelligence agent without human intervention, the remote support terminals 110 may be omitted.

The assignment module 135 facilitates assignments of remote support agents 130 (and in some cases the associated human operator) to vehicles 102. The assignment module 135 may generate assignments on a one-to-one basis (e.g., one remote support agents 130 is assigned to one vehicle), on a many-to-one basis (e.g., multiple remote support agents 130 are assigned to a single vehicle 102), on a one-to-many basis (e.g., one remote support agent 130 is assigned to provide support to multiple vehicles 102), or a many-to-many basis (e.g., multiple remote support agents 130 collectively operate to provide support to multiple vehicles 102). The assignment module 135 may operate dynamically to update assignments as vehicles 102 and remote support agents 130 join or leave the platform or as operating conditions change. Embodiments of techniques for facilitating assignments are described in further detail below in FIGS. 2-9.

The remote support server 120 may comprise a single server or a distributed server that may be implemented using physical servers at different remote locations. The remote support server 120 may furthermore be implemented using one or more virtual machines that may be co-located or distributed. In the case of a distributed server architecture, different remote support agents 130 may operate on different servers from each other and from the assignment module 135. Furthermore, the remote support agents 130 may be co-located or remote from the remote support terminals 110 that they serve. Various aspects of the remote support server 120 may be implemented as a non-transitory computer-readable storage medium storing a set of instructions and one or more processors that execute the instructions to carry out the functions attributed to the remote support server 120 described herein.

The plurality of networks 140 represents the communication pathways between the vehicles 102, the remote support terminals 110, and the remote support server 120. In one embodiment, the networks 140 use standard communications technologies and/or protocols and can include the Internet. In another embodiment, the entities on the networks 140 can use custom and/or dedicated data communications technologies. The plurality of networks 140 may comprise networks of different types such as, for example, a public cellular connection, a dedicated or private wireless network, a low-latency satellite uplink, VANET wireless channels (including vehicle-to-vehicle or vehicle-to-infrastructure links), or any combination thereof. Furthermore, the plurality of networks 140 may include multiple networks of the same type operated by different service providers. The network devices 145 may include cell towers, routers, switches, LEO satellite uplink devices, WiFi hotspot devices, VANET devices, or other components that provide network services to the entities connected to the plurality of networks 140. The network devices 145 may be integrated into roadside infrastructure units that are integrated with traffic devices or other roadside systems. The network devices 145 may have varying capabilities and may be spread over a wide geographic area. Thus, different allocations of network resources may be available to vehicles 102 in different locations at different times depending on environmental factors, the capabilities of different network devices 145, and network congestion in the area where each vehicle 102 is located.

In an embodiment, the remote support server 120 provides a dedicated channel via the network 140 for sending emergency stop signals to the vehicles 102. The dedicated channel may be separate from the general control channel and may enable transmission of emergency stop signals with high priority and low latency. For example, in an embodiment, the remote support server 120 comprises a gateway for enabling cell phone technology such as GSM or satellite phone technology such as Iridium to transmit emergency messages. Responsive to an initialization event such as the registration of a vehicle 102 with the remote support server 120 or receiving a remote support request, the remote support server 120 establishes and maintains an ongoing phone call to the vehicle 102. In one embodiment, the remote support server 120 may encode an emergency message as an audio signal modulated according to a chosen scheme such as amplitude modulation, frequency modulation or pulse-code modulation. The computer onboard the vehicle 102 may then decode the audio signal and parse the emergency message. In another embodiment, the remote support server 120 may utilize phone call termination as an emergency stop message. The computer onboard the vehicle 102 may use the hangup cause code to distinguish between a call terminated by the remote support server 120 and a call terminated due to technical causes which must not be interpreted as an emergency stop command.

In an embodiment, the remote support server 120 additionally comprises a gateway for using a licensed radio broadcast frequency band as a carrier for emergency stop signals. The remote support server 120 may encode an emergency message specifying the identifier of the recipient vehicle 102 or a plurality thereof as an audio signal modulated according to a chosen scheme (such as amplitude modulation or frequency modulation) and execute a radio broadcast transmission. A vehicle 102 may continuously monitor the designated radio frequency and decode incoming audio signals. Responsive to receiving an audio signal that can be successfully decoded, the vehicle 102 may compare vehicle identifiers listed in the emergency signal to its own identifier. If a match is found, the vehicle 102 may execute the emergency stop command. In another embodiment, the platform uses a CB radio or an FRS two-way communication band instead of a broadcast band.

In an embodiment, the remote support server 120 additionally comprises a gateway for using a license-free sub-gigahertz radio frequency band as a carrier for spread spectrum modulated signals (for example, using the LoRa technology). Responsive to an initialization event such as the registration of a vehicle 102 or a remote support request, the remote support server 120 adds the vehicle 102 to the dedicated digital network such as LoRaWAN. The remote support server 120 may identify a vehicle 102 with a unique identifier or an address, and transmit emergency messages to that address.

In an embodiment, the remote support server 120 additionally comprises a gateway to a directed microwave, laser beam, Bluetooth or other distributed communication network, and the vehicle 102 additionally comprises a respective receiver and an optional auxiliary tag to simplify or facilitate tracking by the communication network. Responsive to an initialization event such as the registration of a vehicle 102 or a remote support request, the remote support server 120 initiates tracking of the position and orientation of the vehicle 102 by the appropriate components of the communication network with a precision sufficient for reliable directed signal transmission, and identifies the auxiliary tag on the vehicle 102 with an identifier known to the remote support server 120. The remote support server 120 may emit an emergency message to be relayed by the communication network to a vehicle 102 possessing a specific identifier or a plurality thereof, and the communication network may use the mapping information to determine the corresponding tag and then the tracking information to determine a suitable node to perform the transmission.

In an embodiment, the remote support server 120 additionally comprises a remote support fault storage and analysis subsystem where a state of a remote support session at a given point in time is described in part by a predicted reliability or quality metric and an actual reliability or quality metric. The remote support server 120 further comprises a subsystem providing programmatic access individually to the segments of the fault database. These segments may include a first segment corresponding to a predicted success and an actual fault of the remote support session, a second segment corresponding to a predicted fault and an actual success of the remote support session, a third segment corresponding to a predicted success and an actual success of the remote support session, and a fourth segment corresponding to a predicted fault and an actual fault of the remote support session. The remote support server 120 may perform selection of data points corresponding to each segment depending on specific metric functions.

FIGS. 2-6 illustrate various examples of remote support modes that can be provided by the remote support agents 130. These modes may be requested by the vehicle 102 or may be determined by the remote support server 120. For example, a fleet of vehicles with a common owner may be preconfigured to operate using a certain mode of remote support while a different fleet of vehicles may be configured to operate with a different remote support mode. Furthermore, the remote support mode can change dynamically depending on the location of the vehicle 102, sensed conditions, or other factors.

Figure 2:
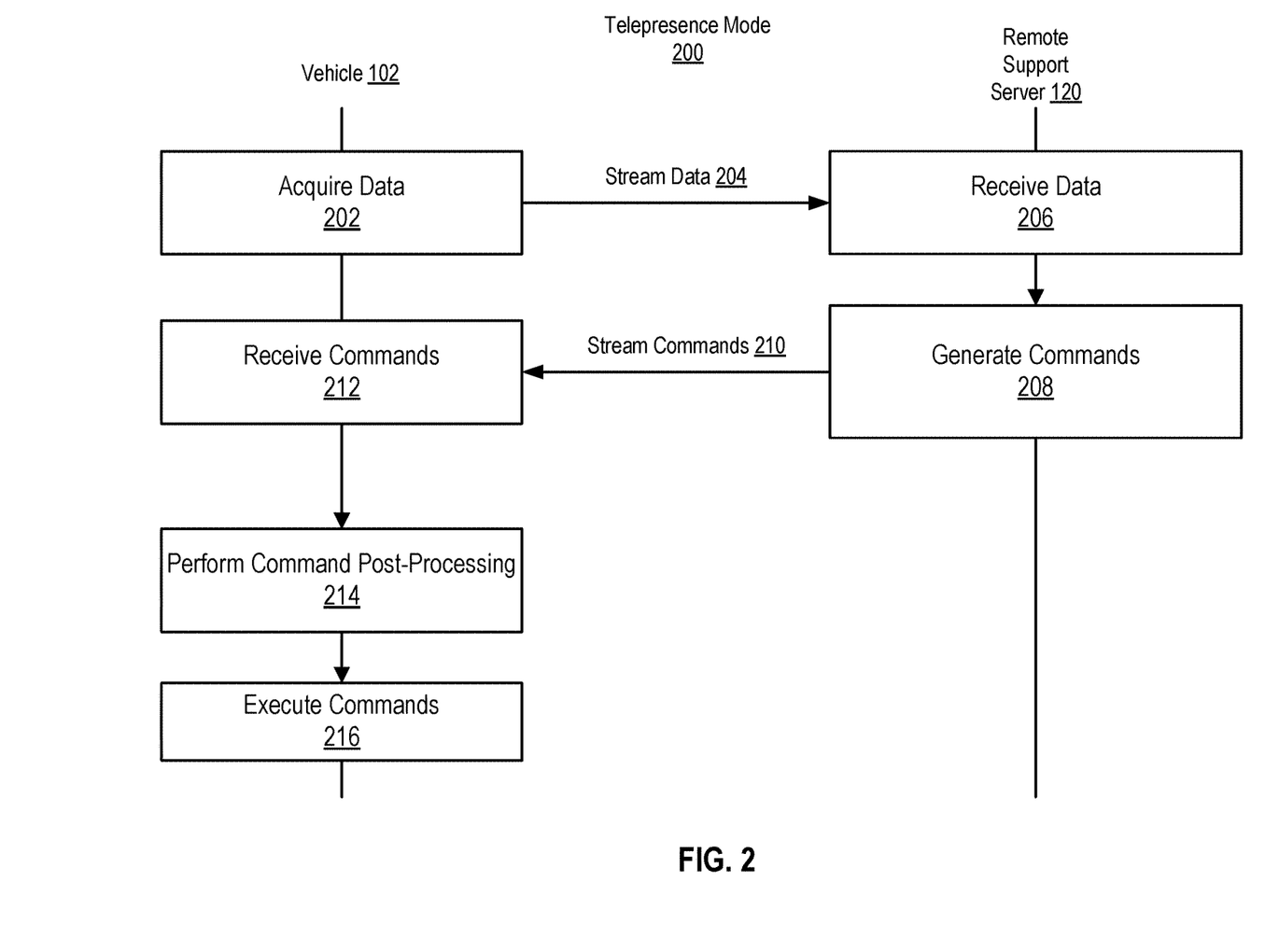
FIG. 2 illustrates a process for providing remote support to a vehicle in a telepresence mode.

FIG. 2 illustrates an example embodiment of a telepresence mode 200 of remote support. In this mode, the remote support server 120 takes primary control of the vehicle 102. The vehicle 102 acquires 202 a real-time feed of video and other sensor data and streams 204 the data to the remote support server 120 over the one or more networks 140. The remote support server 120 receives 206 the data and generates 208 control commands for the vehicle 102. A remote support agent 130 of the remote support server 120 may generate the commands directly or may generate the commands based on input from a human teleoperator at a remote support terminal 110. The remote support server 120 streams 210 the control commands to the vehicle 102. The vehicle 102 receives 212 the commands and optionally performs 214 post-processing on the commands. The post-processing may include, for example, minimal safety-related post-processing to ensure the commands do not cause the vehicle 102 to take an action that the vehicle system determines is unsafe. The vehicle 102 then executes 216 the commands. In the telepresence mode 200, the vehicle 102 possesses little or no degree of autonomy and instead delegates all or most of the decision-making process to the remote support server 120. The remote support agent 130 acts based on acquired data that may closely reproduce the environment observed by a driver to simulate an in situ driving experience.

Figure 3:
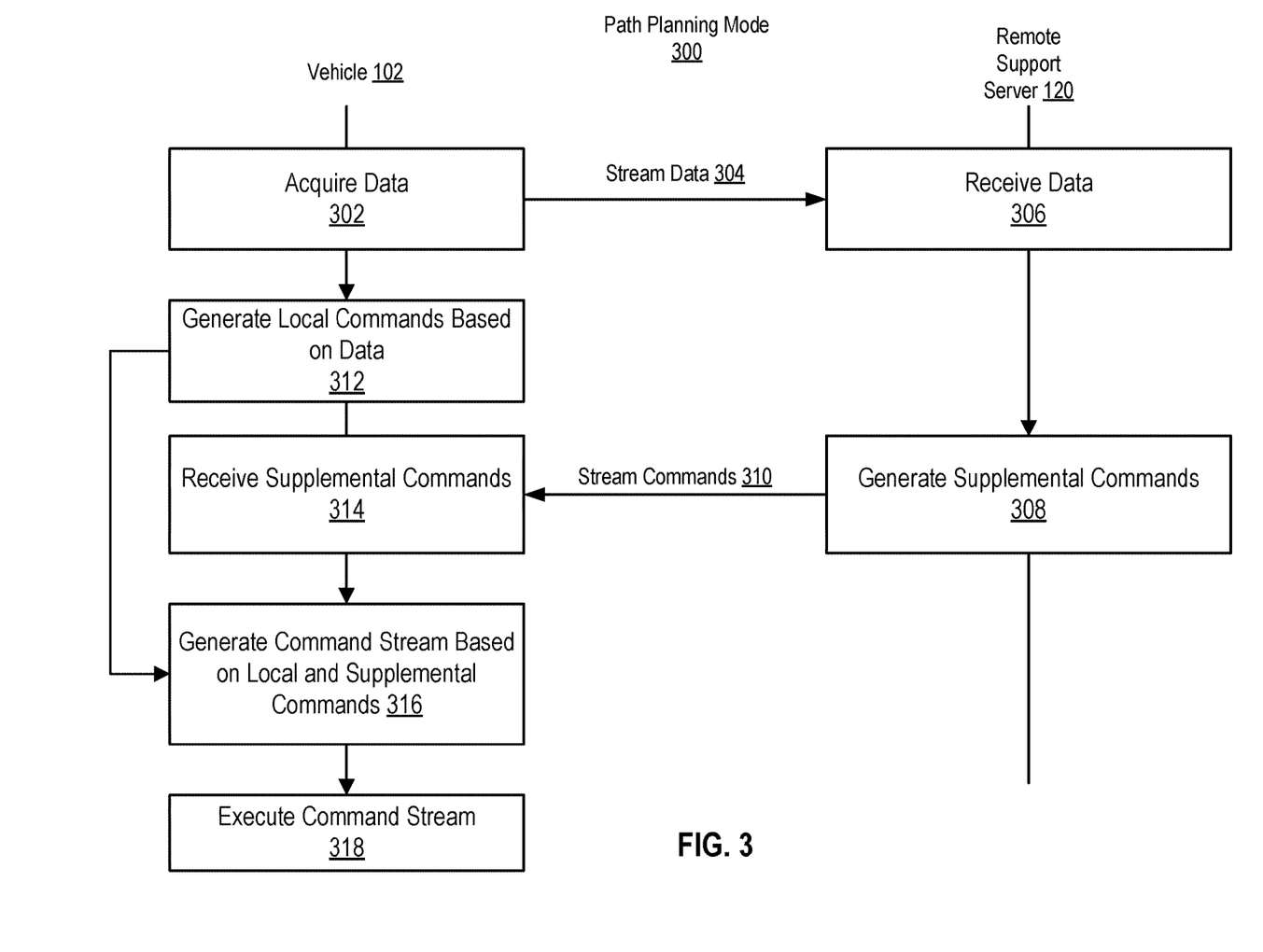
FIG. 3 illustrates a process for providing remote support to a vehicle in a path planning mode.

FIG. 3 illustrates an example embodiment of a path planning mode 300 of remote support. In this mode, the vehicle generally controls its own operation, but the remote support server 120 can override the vehicle controls to provide steering, braking, or acceleration commands in response to detecting hazardous conditions. The vehicle 102 acquires 302 a real-time video feed and other sensor data and streams 304 the data to the remote support server 120. In parallel, the vehicle 102 provides the data to a local navigation system, which generates 312 local commands for operating the vehicle 102 in accordance with the locally configured navigation trajectory. The remote support server 120 receives 306 the data and generates supplemental commands 308 that may alter the vehicle trajectory from the locally configured trajectory. Here, for example, the supplemental commands may be provided in response to detecting hazardous conditions and may initiate emergency braking or steering controls to avoid the hazard. The vehicle 102 receives 314 the supplemental commands 314 and generates 316 a command stream based on the supplemental commands and the locally generated commands. For example, the vehicle 102 may generally follow the locally generated commands but may override or augment these with the supplemental commands when a hazardous situation is encountered. The vehicle then executes 318 the resulting command stream. In this mode, teleoperator interference is thus utilized primarily in edge cases that the local navigation process is unable to solve, or in cases where the vehicle trajectory needs to be substantially updated.

Figure 4:
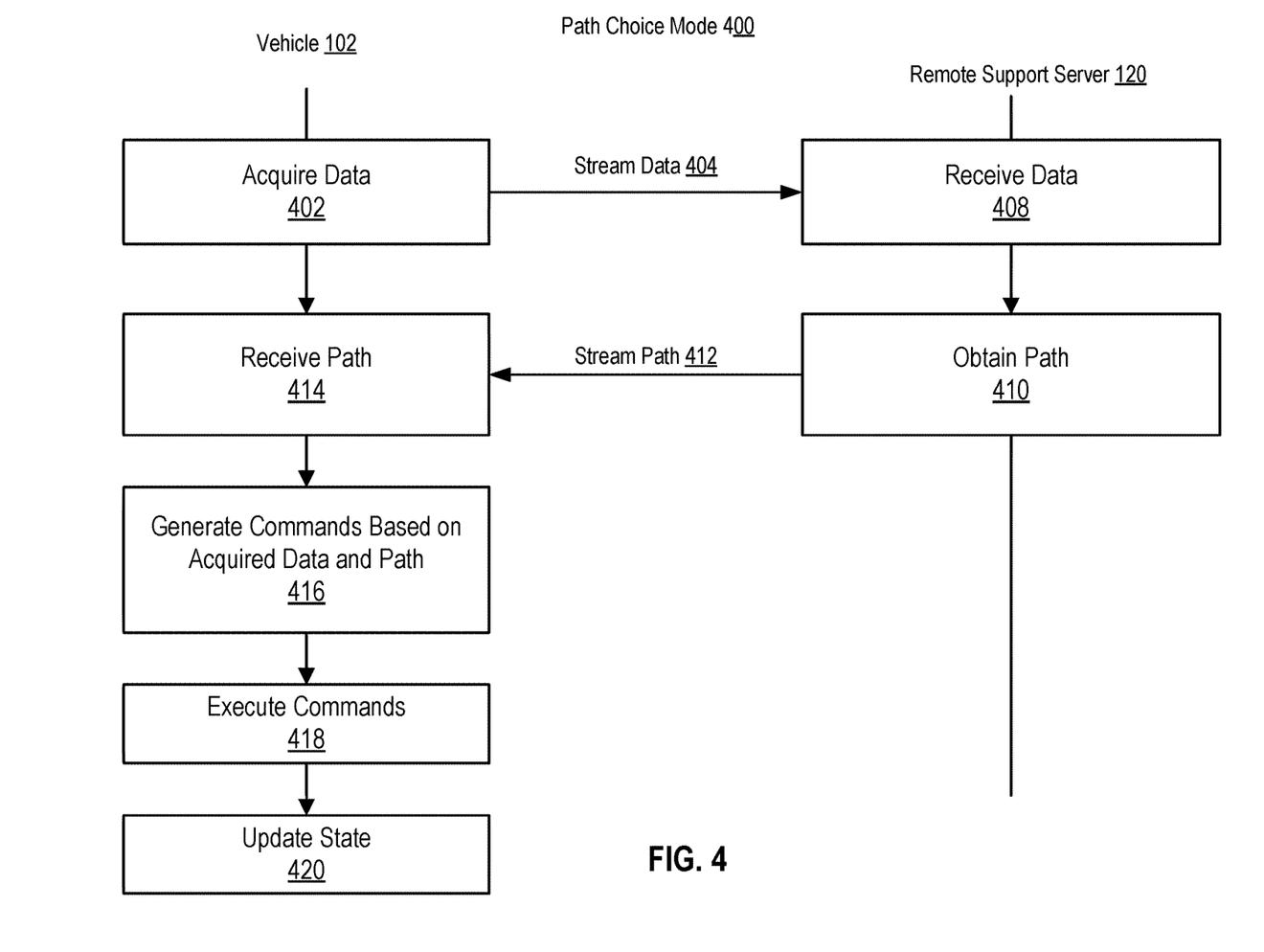
FIG. 4 illustrates a process for providing remote support to a vehicle in a path choice mode.

FIG. 4 illustrates an example embodiment of a path choice mode 400 of remote support. In this mode, the remote support server 120 determines the path of the vehicle 102, but the vehicle 102 generally controls its own operation (e.g., steering, braking, acceleration, etc.) according to the selected path. The vehicle 102 acquires 402 a real-time video feed and other sensor data, and streams 404 the data to a remote support server 120. The remote support server 120 receives 408 the data and obtains 410 a path choice for controlling a path of the vehicle 102. The path choice may be selected by the remote support agent 130 (either directly or based on controls from a human teleoperator via a remote support terminal 110) from a predefined set of path options. Here, the path options may be based on the local road geometry and path homotopies determined by detected static or dynamic obstacles. The remote support server 120 streams 412 the path to the vehicle 102. The vehicle 102 receives 414 the path and based on the path choice and locally observed data, generates 416 control commands using a local navigation process. The commands may control the drive system of the vehicle to maintain the trajectory specified by the path. The vehicle 102 subsequently executes 418 the commands. The vehicle 102 furthermore update 420 an internal state associated with the local navigation process to cause the vehicle 102 to maintain the target trajectory associated with the path until further updated.

Figure 5:
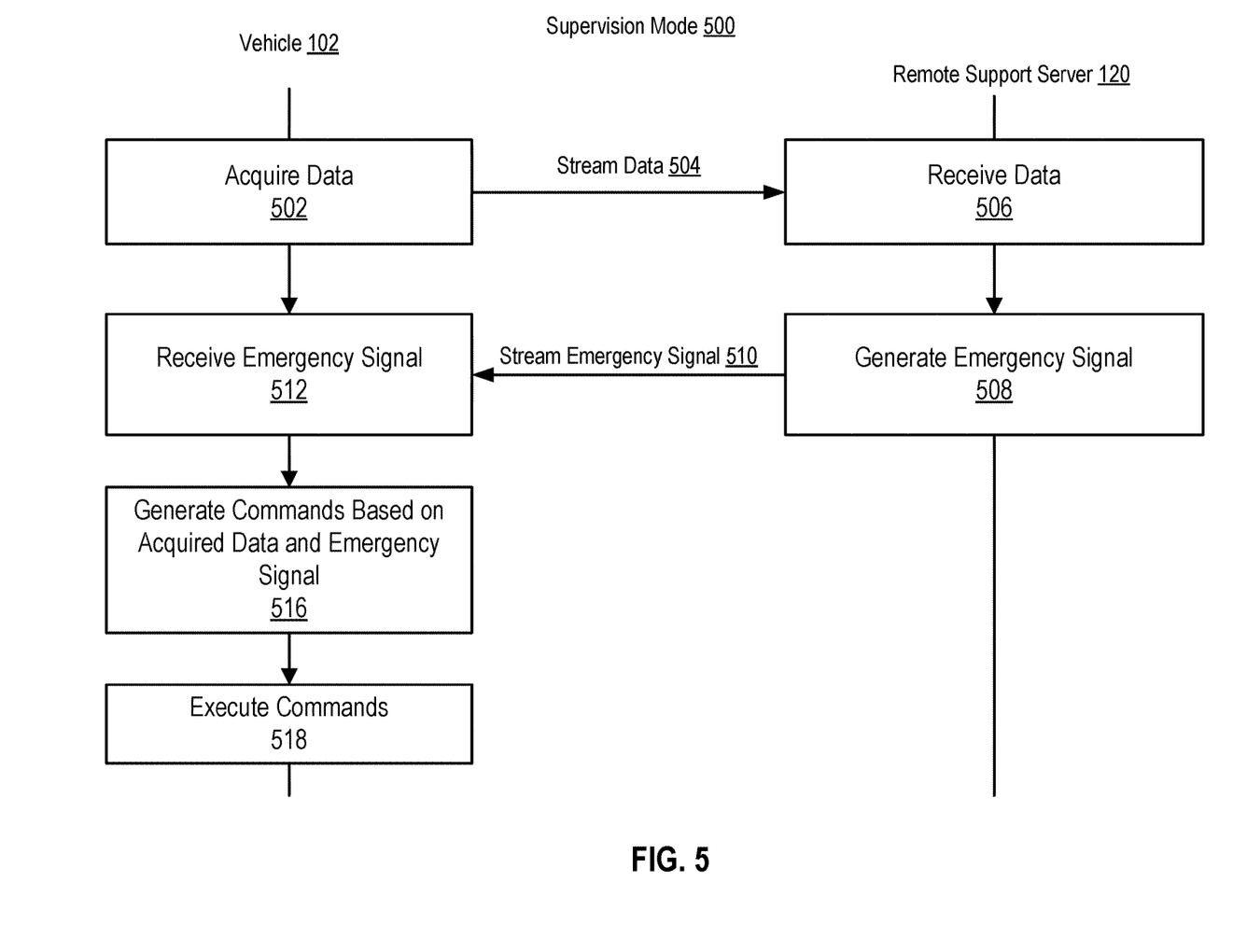
FIG. 5 illustrates a process for providing remote support to a vehicle in a supervision mode.

FIG. 5 illustrates an example embodiment of a supervision mode 500 of remote support. In this mode, the vehicle 102 generally controls the operation and trajectory of the vehicle, but the remote support server 120 monitors the vehicle 102 and can generate an emergency stop in response to an emergency. The vehicle 102 acquires 502 a real-time video feed and other sensor data, and streams 504 the data to a remote support server 120. The remote support server 120 may generate 508 an emergency signal in response to an emergency situation being detected. The emergency signal may be initiated automatically or manually by a teleoperator. When initiated, the emergency signal is transmitted 510 to the vehicle 102. The vehicle 102 sends the acquired data to a local navigation process and receives 512 any emergency signal sent from the remote support server 120. Responsive to the data stream and the available information on the desired vehicle trajectory, the chosen route and the destination, the local navigation process generates 516 control commands to actively navigate the vehicle around obstacles and to follow the previously established route to the destination which the vehicle 102 subsequently executes 206. If an emergency signal is received, the local navigation process executes the emergency command. Here, the vehicle 102 may perform an established emergency stop procedure for the currently observed environment, which may include hard braking, emergency parking, abandoning the road, or other maneuvers.

Figure 6:
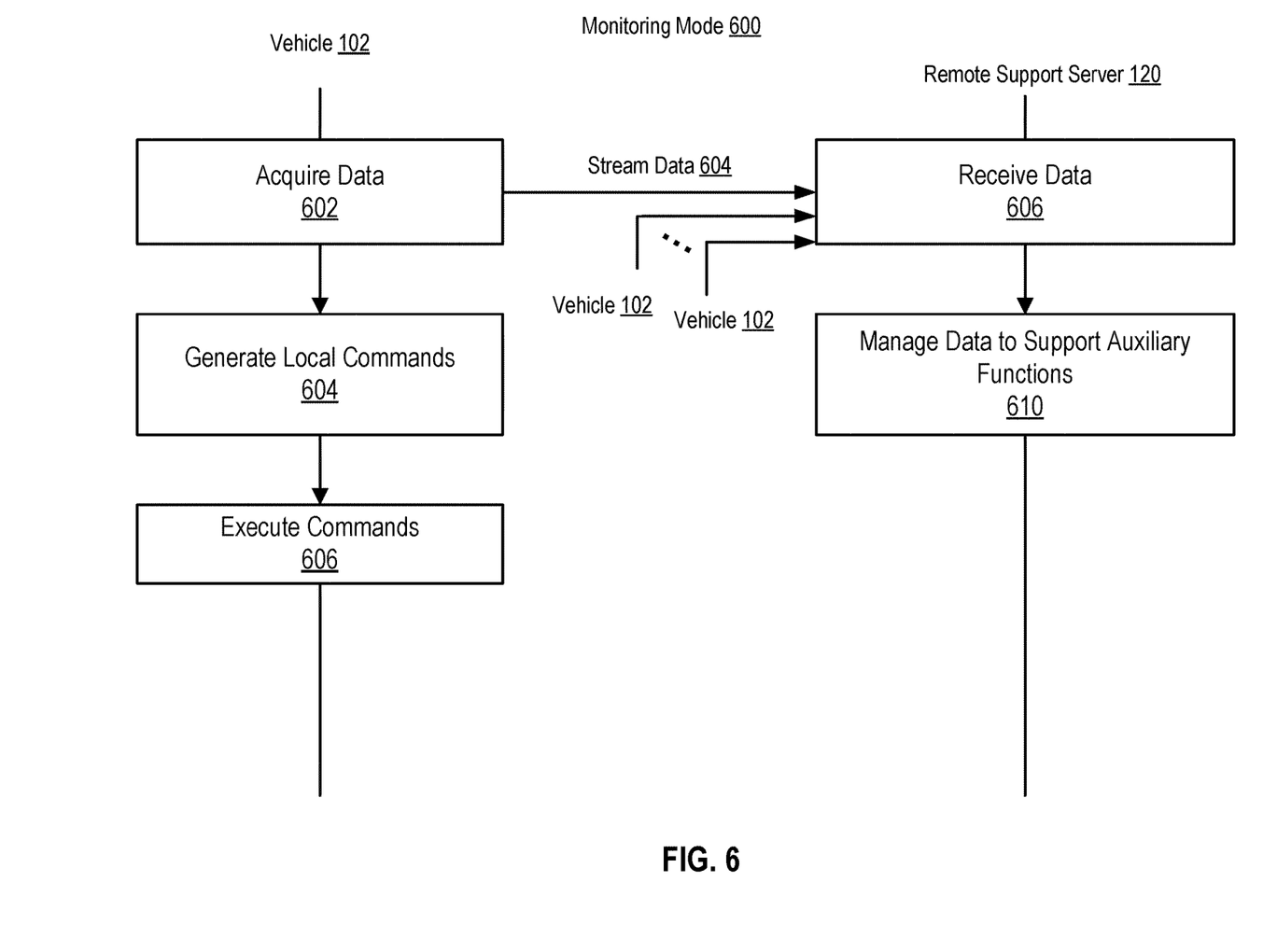
FIG. 6 illustrates a process for providing remote support to a vehicle in a monitoring mode.

FIG. 6 illustrates an example embodiment of a monitoring mode 600 of remote support. In this mode, the vehicle 102 controls its operation and trajectory, and the remote support server 120 provides only monitoring functions. In the monitoring mode 600, the vehicle 102 acquires 602 a real-time video feed and other sensor data, streams 608 it to a local navigation system of the vehicle 102 and in parallel streams 604 the data to a remote support server 120. The local navigation system generates 604 local commands for controlling the vehicle 102 based on the received data stream and other control information such as the desired vehicle trajectory, the chosen route, and the destination. The local navigation system of the vehicle 102 executes 606 the commands. The remote support server 120 receives 608 the data from the vehicle 102 and manages 610 the data to support auxiliary functions such as data recordation or supervisor notifications. The remote support server 120 may furthermore aggregate data received from multiple vehicles 102 to generate various analytics that can be used in other modes of remote support or enable the teleoperator to focus attention on specific data feeds.

Figure 7:
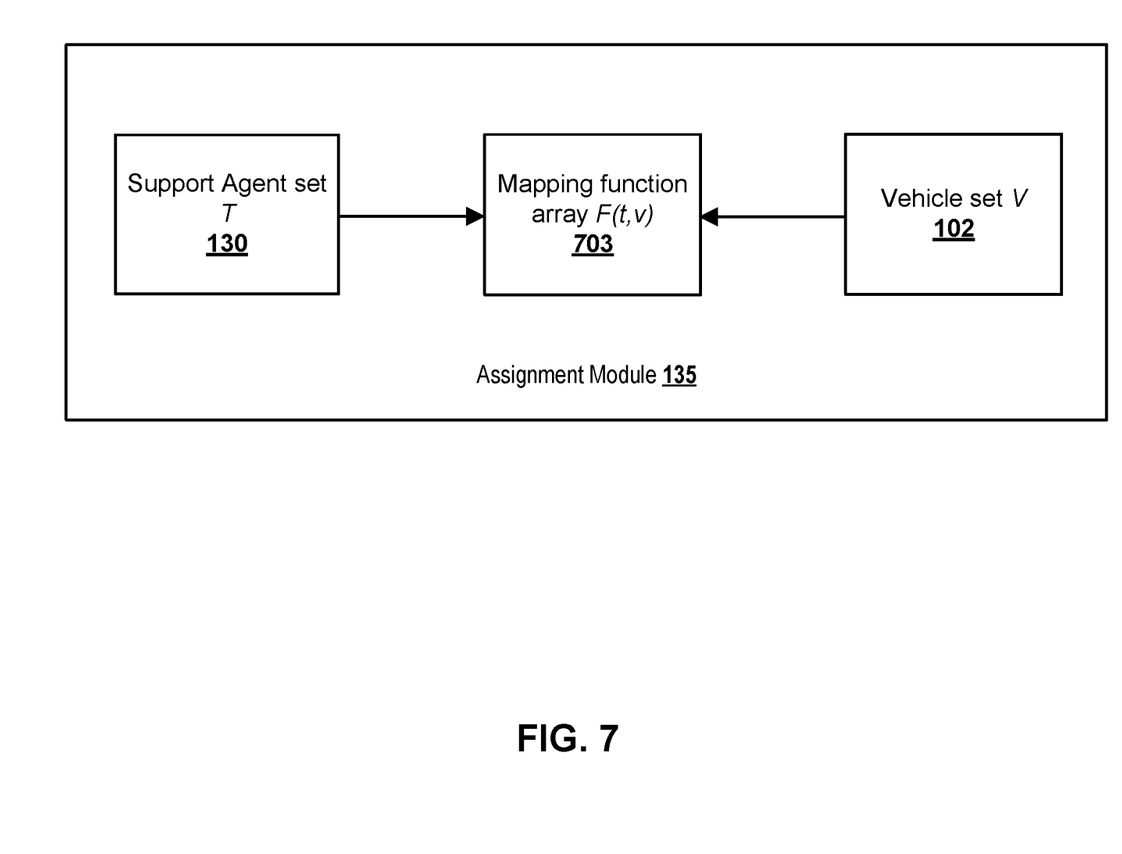
FIG. 7 is a flowchart illustrating a process for assigning remote support agents to a vehicle.

FIG. 7 is a block diagram illustrating an assignment module 135 for generating a mapping array for generating assignments between a plurality of connected vehicles and remote support agents 130. The assignment module 135 obtaining information about a set of vehicles V 102 and a set of support agents T 130. A mapping function array F(t, v) 703 maps vehicles 102 to support agents 130 based on the obtained information and various mapping criteria.

In an embodiment, the assignment module 135 can be modeled using an abstract representation including a discrete set T of support agents $t \in T$ 130, a discrete set V of connected vehicles 102 $v \in V$ that may be represented as a dynamic non-intersecting collection of non-empty subsets $\dot{V} \in V$, and an array of boolean functions F 703 determining the mapping of instances of $t_i$ to the subsets $\dot{V}_j$ such that there exists one and only one pair $\exists!(i, j)$ for which a function $F_k(t_i, \dot{V}_j)$ returns true and any value of i or j is encountered in the mapping function array 703 at most once. A value of i that is not encountered in the mapping function array 303 denotes an idle support agent $t_i$; a value of j that is not encountered in the mapping function array 703 denotes a subset $\dot{V}_j$ of vehicles 102 that is not served by any support agent. Such an embodiment allows for enforcement of one-to-one mapping between vehicles 102 and support agents 130, while also permitting autonomous vehicle function.

In another embodiment, the assignment module 135 may generate mappings in a prioritized manner such that each vehicle 102 or subset of vehicles 102 is mapped to an ordered list of support agents 130. Here, the functions $F_k$ of the mapping function array 703 depend on a priority parameter p such that there exists a triplet $\exists(i, p, j)$ for which a function $F_k(t_i, p, \dot{V}_j)$ returns true and any value of a triplet of (i, p, j) is encountered in the mapping function array 703 at most once. Such an arrangement permits a subset $\dot{V}_j$ of vehicles 102 to set an order of support agent preference. For example, when a higher priority support agent is not available for service, a vehicle 102 may attempt to set up service with a lower priority support agent. Additional constraints may be placed on the mapping function array 703 for a variety of purposes such as a requirement that any support agent $t_i$ is the primary contact of at most one subset $\dot{V}_j$ of vehicles 102 or that there are no two identical arrays (I, P) corresponding to different subsets $\dot{V}_j$ of vehicles 102.

In another embodiment, the assignment module 135 may generate the mapping based in part on the service mode to be provided to each vehicle 102 or subset of vehicles 102. Here, the functions $F_k$ comprising the mapping function array 703 depend on a service mode parameter $m \in M$ in the discrete set of operation modes M such that there exists a triplet $\exists(i, m, j)$ for which a function $F_k(t_i, m, \dot{V}_j)$ returns true and any value of a triplet of (i, m, j) is encountered in the mapping function array 703 at most once. Such an arrangement permits a subset $\dot{V}_j$ of vehicles 102 to assign different support agents 130 to service modes. For example, a low-grade support agent 130 may be assigned to monitor the activity of an automated industrial vehicle, and a high-grade support agent 130 may be assigned to perform corrective actions when the service mode is changed to reflect the desirability of human intervention.

In another embodiment, the functions $F_k$ comprising the mapping function array 703 depend on both a service mode parameter $m \in M$ and a priority parameter p behaving as defined above.

In an embodiment, the assignment module 135 may dynamically alter the mappings as the set of vehicles 102 and remote support agents 130 change. For example, the assignment module 135 may perform actions such as the addition and removal of individual elements and constrained recreation of subsets, or alterations of the discrete set of support agents T 130. In an embodiment, a new distribution of vehicles v 102 among subsets $\dot{V}$ may be identical to the previous distribution except where a specific individual vehicle $v_z \in \dot{V}_x$ is excluded from the subset $\dot{V}_x$ and is assigned as the sole element of the subset $v_z \in \dot{V}_z$. For example, this embodiment may be used to upgrade the service tier of an individual vehicle and enable its assignment to a pool of high-grade remote support agents 130 while maintaining minimal possible disturbance of existing mappings, thus reducing the potential downtime and reliability penalties. Responsive to an alteration of the discrete set V of connected vehicles 102 or the discrete set T of remote support agents, the assignment module 135 recomputes the mapping function array 703. In a further embodiment, the assignment module 135 additionally employs methods for automatically building new distribution of vehicles v 102 among subsets $\dot{V}$ responsive to environment conditions sensed by some of the vehicles 102 or responsive to information acquired from other data sources.

In an embodiment, the mapping function arrays 703 comprise two sub-arrays G and H, where the array G is generated manually or with direct human guidance, and the complementary array H is generated automatically using planning domain algorithms. For example, a human planner may determine the mappings and priorities of high-grade remote support agents 130 depending on the terms of service level agreements with individual customers for some service modes, thereby allowing the platform to automatically generate non-conflicting complementary mapping functions. In a further embodiment, the assignment module 135 may notify the human planner of an error if such a non-conflicting complementary mapping solution cannot be computed, or if the array G is internally inconsistent. In a further embodiment, the assignment module 135 may generate a series of complementary arrays $[H_i]$ and sort the arrays by an ascending penalty value. The penalty value may be computed based on the utility functions of the solution elements that were discarded in order to bring the solution to a self-consistent state. For example, a solution that omits supervision of 9 vehicles for a period of time may be assigned a lower penalty than a solution that omits telepresence in 1 vehicle for the same period of time due to a higher crash risk. Subsequently, a human operator or a software component selects an array $H_j$ to be utilized in the final solution.

In an embodiment, the mapping functions $F_k$ 703 additionally depend on local time or other free parameters $F_k (\tau, A)$, allowing for a dynamic assignment of support agent 130 to vehicles 102. For example, such an arrangement may be used to enable human operators to work in shifts, or to have human operators possessing specific experience serve requests best matching their skills.

In a further embodiment, specific expressions for the mapping functions $F_k$ 703 are derived analytically, via a machine learning process or using other considerations and methods. For example, such an arrangement may be used to efficiently switch between remote support modes and the respective assigned support agents 130 responsive to environment conditions sensed by a vehicle 102 (such as detection of an obstacle or a substantial degradation of the autonomous driving system confidence level), signals acquired from a remote support terminal 110 (such as manual override instruction submitted by a teleoperator) or to information acquired from other data sources.

Figure 8:
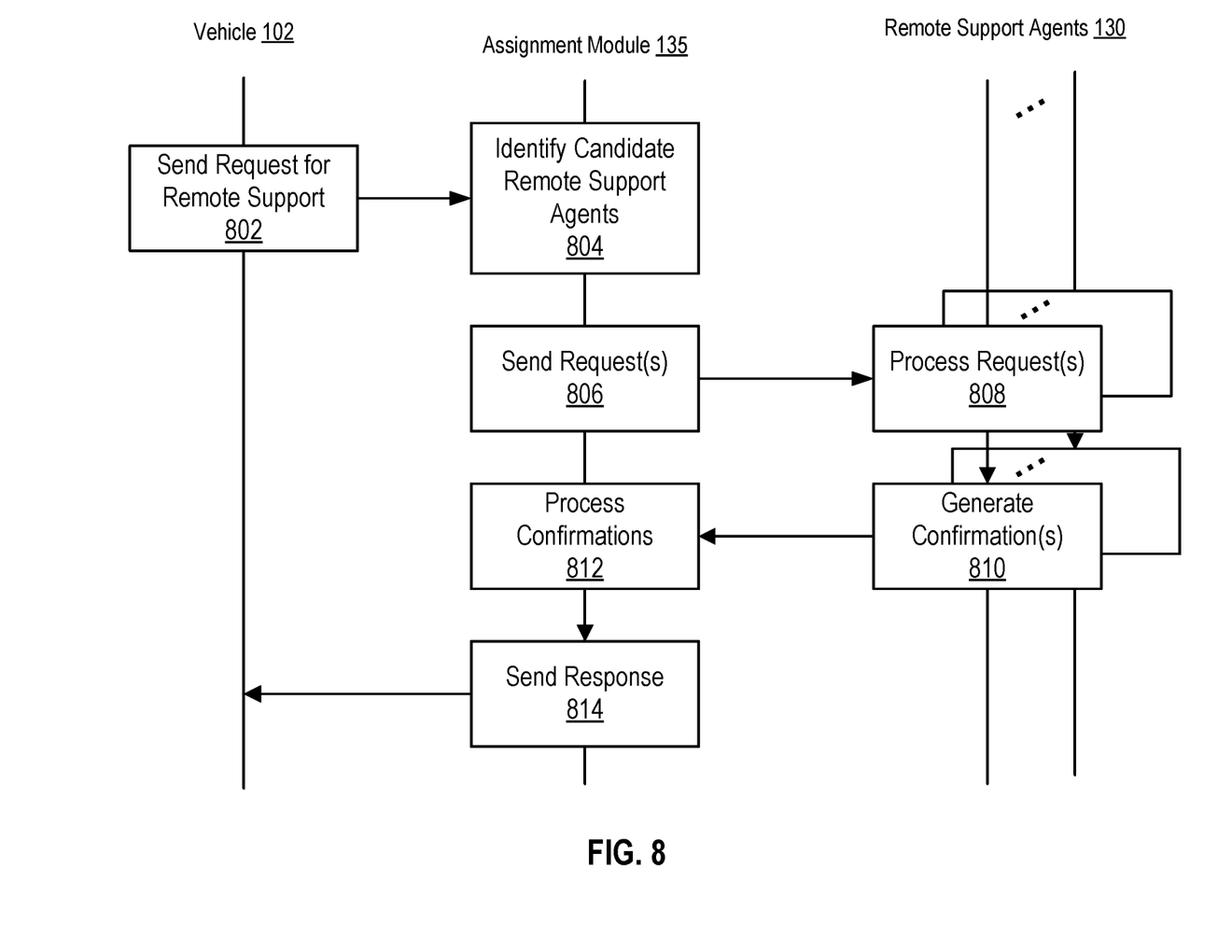
FIG. 8 illustrates a process for establishing one or more remote support sessions.

FIG. 8 illustrates an embodiment of a process for facilitating assignments of remote support agents to vehicles 102. In this embodiment, multiple requests are sent out to determine which remote support agents 130 can be confirmed as available within a response time window, and the assignment module 135 then makes assignments based on the responses. The vehicle 102 sends 802 a request for remote support. The vehicle 102 may send the request as a broadcast request that does not specify specific requested remote support agents 130, or as a multicast remote support request for a designated pool of recipients. In the case of the multicast request, the vehicle 102 may specify identifiers of remote support agents 130 that are preferred, or specific characteristics (e.g., human or machine-based support). The request may optionally include a minimum number and/or a maximum number of remote support agents 130 to be notified of the request. The vehicle 102 may also optionally sets a timeout period after which the vehicle 102 terminates the request if an assignment is not confirmed. The request may furthermore include a diversity argument that controls the diversity of remote support agents 130 being requested. For example, the diversity argument may specify whether requests should be sent to a combination of remote support agents 130 of different types (e.g., human or machine-based support, or machine-based agents operating according to different control algorithms) or remote support agents 130 that are similar or identical.

The assignment module 135 receives the request and identifies 804 a set of candidate remote support agents 130 for fulfilling the request. The candidate remote support agents 130 may be identified based on information received in the request from the vehicle 102 and/or based on a mapping function as described above. The assignment module 135 sends 806 the requests to the multiple candidate remote support agents 130. The available remote support agents 130 process 808 the requests and generate 810 confirmations. The assignment module 135 processes 812 the received confirmations to generate assignments. If a timeout period is specified in the request, the assignment module 135 may wait for the timeout period to receive confirmations from the candidate remote support agents 130. If the timeout period expires before any confirmations arrive, the assignment module 135 includes a failure notification in the response to the vehicle 102. Otherwise the assignment module 135 accepts confirmations from one or more remote support agents 130 and provides a success notification in the response to the vehicle 102. Here, the response may furthermore specify information for enabling the vehicle to establish the remote support session with the one or more selected agents 130. The assignment module 135 may optionally issue retaining requests to remote support agents 130 that send subsequent confirmation responses until a remote support session is established.

In an embodiment, the assignment module 135 selects a single remote support agent 130 from the set of received confirmations. For example, the assignment module 135 may assign the vehicle 102 to the first remote support agent 130 that provides a confirmation.

In another embodiment, the assignment module 135 may select multiple remote support agents 130 to assign to the vehicle 102 from the set of received confirmations. Here, multiple redundant remote support sessions may be established between the vehicle 102 and identical or similar machine intelligence agents that are expected to produce similar or identical command streams. The connections may be established with remote support agents 130 being executed in different data centers and accessible over different peering networks and may therefore provide commands with different associated latencies. By establishing multiple redundant connections, the vehicle 102 can execute the first copy of a redundant command it receives and discard the copies received later from other instances. This allows the vehicle 102 to maintain a low command channel latency in case of unexpected spikes of network latency, severed connections or shortage of computational resources in any individual data center.

Figure 9:
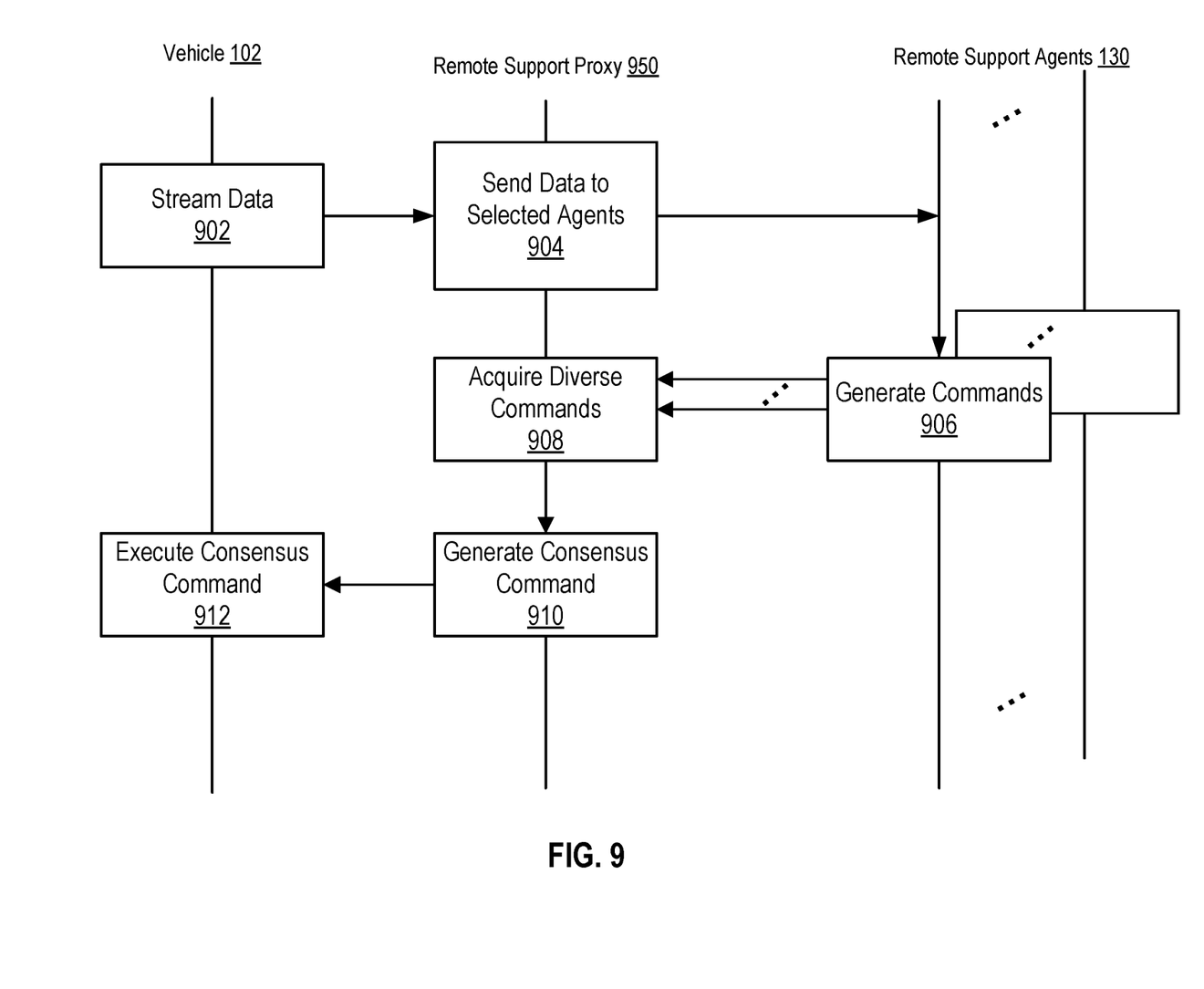
FIG. 9 illustrates a process for facilitating a remote support session via diverse connections to multiple remote support agents.

In another embodiment, the assignment module 135 may instead assign a vehicle 102 to multiple diverse remote support agents 130 that may each generate different command streams. FIG. 9 illustrates a method for facilitating a remote support session between a vehicle and multiple diverse remote support agents 130. In this embodiment, the vehicle 102 streams 902 acquired data to a remote support proxy 950, which sends 904 the data to a set of remote support agents 130. The remote support agents 130 each independently generate 906 commands and send the commands to the remote support proxy 950. The remote support proxy 950 acquires 908 commands from the set of remote support agents 130 over a predefined time period and the remote support proxy 950 then generates 910 a consensus over the received commands. The remote support proxy 950 then sends the consensus command to the vehicle 102, which executes 912 the consensus command. In this embodiment, the remote support agents 130 may execute different control algorithms and may be expected to occasionally produce different or incompatible command sequences in response to the data stream from the vehicle 102. The remote support proxy 950 may generate the consensus command by determining the most popular trajectory proposed by the different remote support agents 130, by optimizing a chosen deviation criterion, or according to a different algorithm. The remote support proxy 950 may optionally provide feedback to the remote support agents 130 specifying the selected consensus commands. The remote support agents 130 may utilize this feedback for calibration and synchronization purposes. This consensus-based scheme remote support scheme may compensate for software bugs or irregularities in individual remote support agents 130 and facilitate their further improvement without sacrificing teleoperation safety levels in a production environment.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, read-only memories (ROMs), random access memories (RAMs), magnetic or optical cards, solid state storage devices, FLASH memory devices, cloud storage devices, or any type of media suitable for storing electronic instructions. Furthermore, the computers referred to in the specification may include a single processor or may be architectures employing multiple processor designs for increased computing capability.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the scope of the embodiments.

The invention claimed is:

1. A method for managing assignments of remote support agents to vehicles, the method comprising:
    obtaining, from a vehicle, a request for a remote support assignment;
    determining based on a mapping function, a mapping of the vehicle to one or more remote support agents;
    sending the request to the one or more remote support agents;
    receiving at least one confirmation response from the one or more remote support agents;
    based on the at least one confirmation response, assigning the vehicle to multiple diverse remote support agents that each execute different models for generating control commands in response to sensor data;
    facilitating, via a proxy server during a remote support session, sending of the sensor data from the vehicle to each of the diverse remote support agents;
    receiving diverse commands in response to the sensor data from the multiple diverse remote support agents;
    determining a consensus command based on the diverse commands; and
    sending the consensus command to the vehicle to control driving of the vehicle.

2. The method of claim 1, wherein the request specifies a maximum number of recipients and wherein sending the request to the one or more remote support agents is limited to the maximum number of recipients.

3. The method of claim 1, wherein the request specifies a minimum number of recipients and a maximum number of recipients, and wherein sending the request to the one or more remote support agents comprises sending the request to at least the minimum number of recipients and not more than the maximum number of recipients.

4. The method of claim 1, wherein the request includes a diversity parameter, and wherein a number of the diverse remote support agents assigned to the vehicle is controlled at least in part by the diversity parameter.

5. The method of claim 1, wherein receiving the diverse commands comprises:
    operating the multiple diverse remote support agents in a telepresence mode in which the diverse commands are generated to facilitate control over at least steering, braking, and acceleration of the vehicle.

6. The method of claim 1, wherein receiving the diverse commands comprises:
    operating the remote support agent in a path planning mode in which the remote support agent controls the vehicle in response to detecting a condition not suitable for handling by an on-board autonomous control system of the vehicle.

7. The method of claim 1, wherein receiving the diverse commands comprises:
    operating the multiple diverse remote support agents in a path choice mode in which the diverse commands are generated to control a path of the vehicle based on the sensor data and wherein an in-vehicle control system controls a drive system of the vehicle to follow the path.

8. The method of claim 1, wherein receiving the diverse commands comprises:
    operating the multiple diverse remote support agents in a supervision mode in which the diverse commands are generated to monitor operation of the vehicle and issue an emergency stop command to cause the vehicle to execute an emergency brake in response to an emergency situation.

9. The method of claim 1, wherein receiving the diverse commands comprises:
    operating the multiple diverse remote support agents in a monitoring mode in which the diverse commands are generated to monitor operation of the vehicle and perform data analysis on a fleet of vehicles including the monitored vehicle.

10. The method of claim 1, wherein determining the mapping of the vehicle to the one or more remote support agents comprises:
    determining an order of priority of the one or more remote support agents based on the mapping function; and
    wherein sending the request to the one or more remote support agents comprises sending the request to one or more remote support agents in the order of priority.

11. The method of claim 1, wherein determining the mapping of the vehicle to the one or more remote support agents comprises:
    determining a service mode of the vehicle based on the request; and
    determining the mapping of the vehicle to the one or more remote support agents based on the service mode.

12. The method of claim 1, further comprising:
    detecting a change in a set of available remote support agents; and
    updating the mapping function responsive to the change.

13. The method of claim 1, wherein the mapping function comprises:
    a first mapping component generated based on manual input from a human operator; and
    a second mapping component generated automatically based on an optimization function.

14. The method of claim 1, where the mapping function is derived from a machine learning process.

15. A non-transitory computer-readable storage medium storing instructions for managing assignments of remote support agents to vehicles, the instructions when executed by a processor causing the processor to perform steps comprising:
    obtaining, from a vehicle, a request for a remote support assignment;
    determining based on a mapping function, a mapping of the vehicle to one or more remote support agents;
    sending the request to the one or more remote support agents;
    receiving at least one confirmation response from the one or more remote support agents;

based on the at least one confirmation response, assigning the vehicle to multiple diverse remote support agents that each execute different models for generating control commands in response to sensor data;

facilitating, via a proxy server during a remote support session, sending of the sensor data from the vehicle to each of the diverse remote support agents;

receiving diverse commands in response to the sensor data from the multiple diverse remote support agents;

determining a consensus command based on the diverse commands; and sending the consensus command to the vehicle to control driving of the vehicle.

16. A vehicle remote support system comprising:

one or more processors; and a non-transitory computer-readable storage medium storing instructions for managing assignments of remote support agents to vehicles, the instructions when executed by the one or more processors causing the one or more processors to perform steps comprising:

obtaining, from a vehicle, a request for a remote support assignment;

determining based on a mapping function, a mapping of the vehicle to one or more remote support agents;

sending the request to the one or more remote support agents;

receiving at least one confirmation response from the one or more remote support agents;

based on the at least one confirmation response, assigning the vehicle to multiple diverse remote support agents that each execute different models for generating control commands in response to sensor data;

facilitating, via a proxy server during a remote support session, sending of the sensor data from the vehicle to each of the diverse remote support agents;

receiving diverse commands in response to the sensor data from the multiple diverse remote support agents;

determining a consensus command based on the diverse commands; and sending the consensus command to the vehicle to control driving of the vehicle.

17. The non-transitory computer-readable storage medium of claim 15, wherein the request specifies a maximum number of recipients and wherein sending the request to the one or more remote support agents is limited to the maximum number of recipients.

18. The non-transitory computer-readable storage medium of claim 15, wherein the request specifies a minimum number of recipients and a maximum number of recipients, and wherein sending the request to the one or more remote support agents comprises sending the request to at least the minimum number of recipients and not more than the maximum number of recipients.

19. The vehicle remote support system of claim 16, wherein the request specifies a maximum number of recipients and wherein sending the request to the one or more remote support agents is limited to the maximum number of recipients.

20. The vehicle remote support system of claim 16, wherein the request specifies a minimum number of recipients and a maximum number of recipients, and wherein sending the request to the one or more remote support agents comprises sending the request to at least the minimum number of recipients and not more than the maximum number of recipients.

* * * * *